(12) United States Patent
Bengtson et al.

(10) Patent No.: US 11,222,206 B2
(45) Date of Patent: Jan. 11, 2022

(54) HARVEST CONFIRMATION SYSTEM AND METHOD

(71) Applicant: Farmers Edge Inc., Winnipeg (CA)

(72) Inventors: Jacob Walker Bengtson, Houston, TX (US); Chad Richard Bryant, Calgary (CA); Faisal Ahmed, Calgary (CA)

(73) Assignee: Farmers Edge Inc., Winnipeg (CA)

( * ) Notice: Subject to any disclaimer, the term of this patent is extended or adjusted under 35 U.S.C. 154(b) by 31 days.

(21) Appl. No.: 16/777,028

(22) Filed: Jan. 30, 2020

(65) Prior Publication Data
US 2020/0250426 A1 Aug. 6, 2020

Related U.S. Application Data

(60) Provisional application No. 62/801,615, filed on Feb. 5, 2019.

(51) Int. Cl.
*G06K 9/00* (2006.01)
*H04W 68/00* (2009.01)
*G06Q 50/02* (2012.01)
*A01B 79/00* (2006.01)

(52) U.S. Cl.
CPC ........ *G06K 9/00657* (2013.01); *A01B 79/005* (2013.01); *G06Q 50/02* (2013.01); *H04W 68/005* (2013.01)

(58) Field of Classification Search
CPC .................................................. G06K 9/00657
USPC ........................................................ 382/111
See application file for complete search history.

(56) References Cited

U.S. PATENT DOCUMENTS

| 2009/0022359 A1* | 1/2009 | Kang ................. G06K 9/00657 382/100 |
| 2016/0202227 A1 | 7/2016 | Mathur et al. |
| 2018/0129210 A1* | 5/2018 | Achtelik ................ B64D 47/08 |

(Continued)

FOREIGN PATENT DOCUMENTS

| EP | 3278281 A1 | 2/2018 |
| WO | 2014203664 A1 | 12/2014 |

OTHER PUBLICATIONS

International Search Report & Written Opinions of PCT/CA2020/050102, dated Apr. 20, 2020, 9 pages.

*Primary Examiner* — Michael R Neff
(74) *Attorney, Agent, or Firm* — Ryan W. Dupuis; Kyle R. Satterthwaite; Ade & Company Inc.

(57) ABSTRACT

A method for determining harvest state of an agricultural field includes obtaining an observed image of the agricultural field from a data store containing agricultural image data, filtering the observed image using an image filtering module to provide a filtered image for processing, and assigning coordinates to the filtered image, the assigning coordinates to the filtered image performed by a coordinate projection module to provide an input image, processing the input image to determine a set of image statistics for the input image using a statistics calculation module, determining by a harvest state prediction module the harvest state of the agricultural field using the set of image statistics, wherein the harvest state is selected from a set including a pre-harvest state, an in-harvest state, and a post-harvest state and electronically transmitting a notification of the harvest state of the agricultural field to a computing device.

20 Claims, 9 Drawing Sheets

(56) References Cited

U.S. PATENT DOCUMENTS

2018/0368338 A1   12/2018   Jerphagnon et al.
2019/0332117 A1*  10/2019   Vasquez-Govea ...... G01S 3/786

* cited by examiner

HARVEST CONFIRMATION SYSTEM AND METHOD

RELATED APPLICATIONS

This application claims priority to U.S. Provisional Application No. 62/801,615, filed Feb. 5, 2019, entitled "Harvest Confirmation System and Method", and hereby incorporated by reference in its entirety.

TECHNICAL FIELD

This description relates to the detection of a crop harvest within an agricultural field. More specifically, this description relates to the use of remotely-sensed image data to detect changes within the agricultural field to confirm a harvest state of the agricultural field.

BACKGROUND

Remotely-sensed image data and products derived from that data (i.e., imagery products) are being increasingly utilized in agriculture. These data products can provide rapid, synoptic estimates of crop condition over acres of agricultural fields. For example, an imagery product estimates crop condition for a field using a combination of features and vegetation indices derived from the observed image's spectral data. By way of illustration, an imagery product may derive a Normalized Difference Vegetation Index (NDVI) from spectral data in the imagery data. An NDVI may demonstrate high correlation between crop biomass and eventual yield, and, therefore, the imagery product may inform a decision for a farmer.

Determining a crop harvest in a particular agricultural field using remotely-sensed image data is useful to growers. A grower might need to provide this information to third parties or stakeholders associated with the grower and/or the field. However, despite the utility offered by imagery products, manual inspection of the images to determine a crop harvest can be time consuming and tedious. Additionally, manual inspection of imagery products may require expertise and experience to properly interpret the data. As such, a method to automatically determine the harvest state of an agricultural field using a remotely-sensed image is desirable.

SUMMARY

This disclosure describes various methods and systems used for the detection and confirmation of harvest state in an agricultural field based on satellite imagery. In an example, the method involves a field-level prediction process. Remotely-sensed images of a field are classified into one of the following three harvest states: i) pre-harvest, ii) in-harvest, or iii) post-harvest. Once the agricultural field in the image has been classified, it may be accessed by the grower or authorized third-party entities. Furthermore, this information may be sent to the grower or authorized third-party entities in the form of a notification.

According to one aspect, a method for determining harvest state of an agricultural field based on imagery of the agricultural field is provided. The method includes obtaining an observed image of the agricultural field from a data store containing agricultural image data, filtering the observed image using an image filtering module to provide a filtered image for processing, and assigning coordinates to the filtered image, the assigning coordinates to the filtered image performed by a coordinate projection module to provide an input image. The method further includes processing the input image to determine a set of image statistics for the input image using a statistics calculation module wherein the set of image statistics includes at least one vegetation index for the agricultural field. The method further includes determining by a harvest state prediction module the harvest state of the agricultural field using the set of image statistics, wherein the harvest state is selected from a set including a pre-harvest state, an in-harvest state, and a post-harvest state and electronically transmitting a notification of the harvest state of the agricultural field to a computing device.

The method may further include remote sensing the agricultural image data and storing the agricultural image data in the data store. The method may further include processing the input image using a feature extraction module to determine a feature set for the input image and wherein the feature set is used by the harvest state prediction module in determining the harvest state of the agricultural field. The feature extraction module may use a plurality of feature models to generate a plurality of feature sub-predictions of the harvest state, the method may further include aggregating the feature sub-predictions to result in an aggregate feature prediction and the aggregate feature prediction may be used by the harvest state prediction module in determining the harvest state. Each of the plurality of feature models may be verified using a verification module. The method may further include applying a plurality of statistical models to the set of image statistics to generate a plurality of sub-predictions and aggregating the sub-predictions to result in an aggregate statistical prediction and the aggregate statistical prediction may be used by the harvest state prediction module in determining the harvest state. Each of the plurality of statistical models may be verified using a verification module. The at least one vegetation index may include at least one of a Normalized Difference Vegetation Index (NDVI) and an Enhanced Vegetation Index (EVI).

According to another aspect, a computer system includes one or more processors, a data store containing agricultural image data, the data store in operative communication with the one or more processors, and one or more non-transitory computer-readable storage media storing sequences of program instructions defining a plurality of modules including an image filtering module, a coordinate projection module, a statistics calculation module, and a harvest state prediction module which, when executed by the one or more processors, cause the one or more processors to: obtain an observed image of the agricultural field from the data store containing agricultural image data, filter the observed image using the image filtering module to provide a filtered image for processing, assign coordinates to the filtered image, the assigning coordinates to the filtered image using the coordinate projection module to provide an input image, process the input image to determine a set of image statistics for the input image using the statistics calculation module wherein the set of image statistics include at least one vegetation index for the agricultural field, determine by the harvest state prediction module the harvest state of the agricultural field using the set of image statistics, wherein the harvest state is selected from a set comprising a pre-harvest state, an in-harvest state, and a post-harvest state, and electronically transmit a notification of the harvest state of the agricultural field to a computing device. The data store may be operatively connected over a network to an observation system for remote sensing the agricultural image data. The plurality of modules may further include a feature extraction module and which when executed further cause the one or more processors to determine a feature set for the input image and the feature set may be used by the harvest state prediction module in determining the harvest state of the agricultural field The feature extraction module may use a plurality of feature models to generate a plurality of feature sub-predictions of the harvest state, the method may further include aggregating the feature sub-predictions to result in an aggregate feature prediction and the aggregate feature prediction may be used by the harvest state prediction module in determining the harvest state. The plurality of modules may further include a verification module and each of the plurality of feature models may have been verified using the verification module. The statistics calculation module may apply a plurality of statistical models to the set of image statistics to generate a plurality of sub-predictions and aggregate the sub-predictions to result in an aggregate statistical prediction and the aggregate statistical prediction may be used by the harvest state prediction module in determining the harvest state. Each of the plurality of statistical models may have been verified using a verification module. The at least one vegetation index may include at least one of a Normalized Difference Vegetation Index (NDVI) and an Enhanced Vegetation Index (EVI).

According to another aspect, a method for determining harvest state of an agricultural field based on imagery of the agricultural field is provided. The method may include remote sensing agricultural image data and storing the agricultural image data in a data store, obtaining an observed image of the agricultural field from the data store containing the agricultural image data, filtering the observed image using an image filtering module to provide a filtered image for processing, assigning coordinates to the filtered image, the assigning coordinates to the filtered image performed by a coordinate projection module to provide an input image, processing the input image to determine a set of image statistics for the input image using a statistics calculation module wherein the set of image statistics include at least one vegetation index for the agricultural field, processing the input image using a feature extraction module to determine a feature set for the input image and wherein the feature set is used by the harvest state prediction module in determining the harvest state of the agricultural field, determining by a harvest state prediction module the harvest state of the agricultural field using the set of image statistics and the feature set, wherein the harvest state is selected from a set comprising a pre-harvest state, an in-harvest state, and a post-harvest state, and electronically transmitting a notification of the harvest state of the agricultural field to a computing device. The feature extraction module may use a plurality of feature models to generate a plurality of feature sub-predictions of the harvest state, the method may further include aggregating the feature sub-predictions to result in an aggregate feature prediction and the aggregate feature prediction may be used by the harvest state prediction module in determining the harvest state. The method may further include applying a plurality of statistical models to the set of image statistics to generate a plurality of sub-predictions and aggregating the sub-predictions to result in an aggregate statistical prediction. The aggregate statistical prediction may be used by the harvest state prediction module in determining the harvest state. Each of the plurality of statistical models and each of the plurality of feature models may be verified using a verification module.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable, similar or like reference numbers may be used in the figures and may indicate similar or like functionality. The figures depict embodiments of the disclosed system (or method) for purposes of illustration only.

Overview

With an ever-growing number of available imaging platforms, it is increasingly possible for growers to acquire very high-frequency imagery of an agricultural fields. For example, commercial satellite platforms are capable of offering sub-daily revisit frequencies to a particular agricultural field. Additionally, the proliferation of commercial-grade unmanned aerial platforms allows growers to obtain their own imagery. However, higher image frequency is impractical for growers to manually sort and analyze to obtain data for their agricultural fields.

Satellite imagery presents many challenges in the agricultural industry because images are crop and crop-cycle dependent. For example, different stages of a crop growth cycle result in certain patterns in a vegetation index value: negative changes to the index can indicate a deleterious effects on the crops (e.g., insect damage, nutrient deficiency, hail damage, etc.), and positive changes to the index can indicate the presence of weeds in the crop cycle (e.g., prior to crop growth and/or during crop senescence). Taken on their own, changes in a vegetation index may provide a false indication of an agricultural field's harvest state. In other words, the vegetation index may misrepresent whether an agricultural field is pre-harvest, in-harvest, or post-harvest.

Described herein is a method and system used for accurately determining and confirming a harvest state of an agricultural field based on observed images (e.g., satellite imagery) of the agricultural field. Observed images are classified into one of three harvest states: i) "pre-harvest," ii)

"in-harvest," or iii) "post-harvest." Determined harvest states are transmitted to a manager of the agricultural field as a notification. In a particular example, once a post-harvest state is detected, a notification of the harvest state may automatically be sent to the growers (or another third-party entity). A detailed description of the processes and algorithms utilized in this system follows below, including specific example implementations.

System Environment

Figure 1:
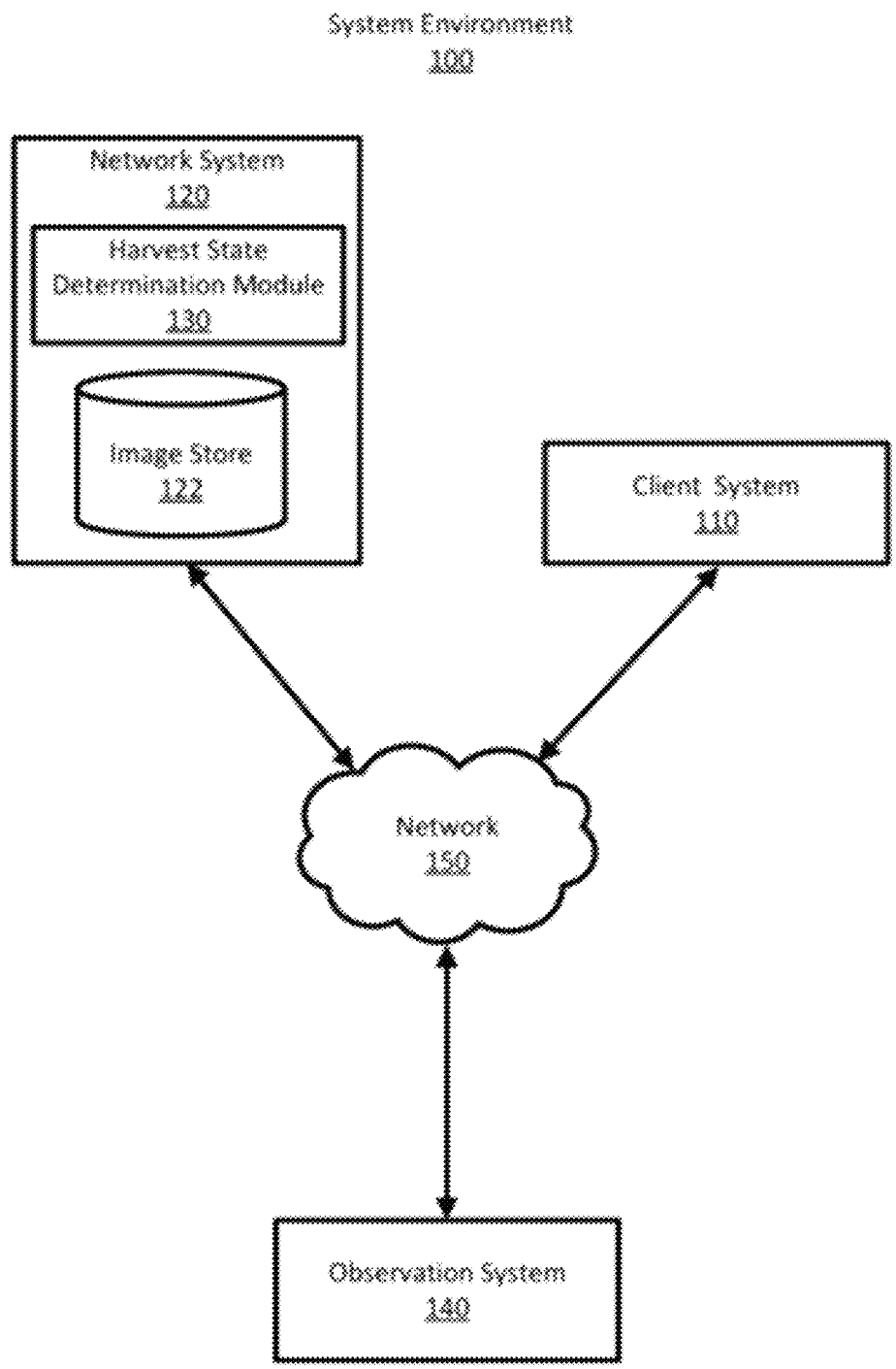
FIG. 1 illustrates a system environment for determining a harvest state for an agricultural field, according to one example embodiment.

FIG. 1 illustrates a system environment for determining a harvest state for an agricultural field, according to one example embodiment. Within the system environment 100, a network system 120 includes a harvest state determination ("HSD") module 112 that determines the harvest state of the agricultural field. A harvest state is the current state of harvest for the agricultural field and may be pre-harvest, in-harvest, or post-harvest. The HSD module 112 determines a harvest state using an observed image of an agricultural field. When determining a harvest state, the network system 120 may request observed images from an observation system 140 via the network 150, and the observation system 140 may provide observed images in response. In an embodiment, responsive to HSD module 130 determining a target harvest state, the HSD module 130 transmits a notification of the target harvest state to a client system 110 via a network 150.

Other examples of a system environment are possible. For example, in various embodiments, the system environment 100 may include additional or fewer systems. To illustrate, a single client system may be responsible for multiple agricultural fields. The network system may leverage observations from multiple observation systems 140 to determine a harvest state for each of the agricultural fields. Alternatively, the environment may include multiple client systems and a second network system administrated by a third party. The third party may monitor and/or aggregate the harvest state of several agricultural fields, each agricultural field managed by a distinct operator using a client system. Further, the capabilities attributed to one system within the environment may be distributed to one or more other systems within the system environment 100. For example, the HSD module 112 may be executed on the than the client system 110 rather than a network system 120.

An observation system 140 is a system capable of remotely-sensing data representing a harvest state of an agricultural field. In an embodiment, the remotely-sensed data is an observed image. Herein, an observed image is an image or photograph of an agricultural field taken from a remote sensing platform (e.g., an air plane, satellite, or drone). The observed image is a raster dataset including a number of pixels with each pixel having a pixel value. Pixel values of the pixels in an observed image may represent some ground characteristic or object such as, for example, a plant, a field, or a farming machine. The characteristics and/or objects represented by the pixels may be indicative of the harvest state of the agricultural field in the image.

Figure 2A:
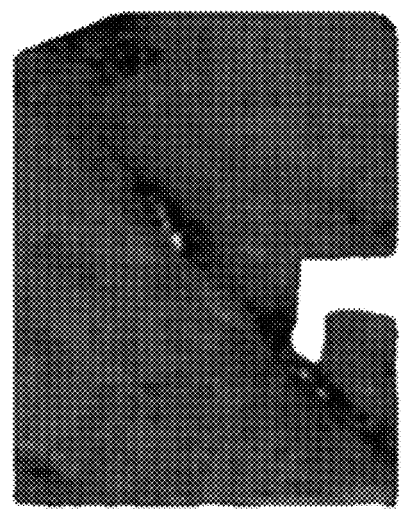
FIGS. 2A-2C illustrate examples of observed images including agricultural fields with harvest states of pre-harvest, in-harvest, and post-harvest, respectively, according to one example embodiment.
Figure 2B:
Figure 2C:
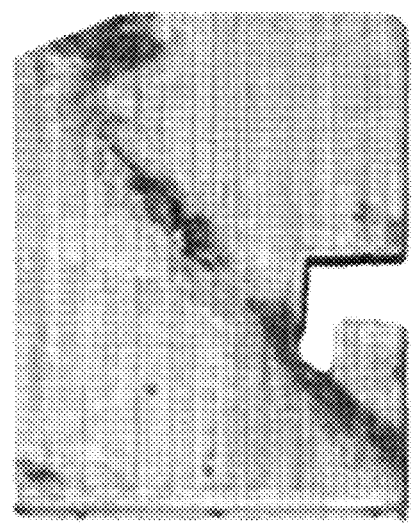

To provide context, FIGS. 2A-2C illustrate observed images obtained by an observation system 140. FIG. 2A is an exemplary observed image of an agricultural field having a pre-harvest harvest state. The observed image 210A in a pre-harvest state includes pixels representing a field that has been planted but not harvested. FIG. 2B is an exemplary observed image of an agricultural field having an in-harvest harvest state. The observed image 210B in an in-harvest state includes pixels representing a field that is partially harvested. Finally, FIG. 2C is an exemplary observed image of an agricultural field having a post-harvest harvest state. The observed image in a post-harvest state includes pixels representing a field that is fully harvested.

Observed images may be stored in an image store 122 on network system 120. For example, observed images 200A, 200B, and 200C may be stored in image store 122. Observed images may be stored as raw data (e.g., groups of pixels with pixel values) as they are received from the observation system 140. Additionally, or alternatively, an observed image may be processed, or filtered, and stored in the image store 122 in a different format.

Figure 3:
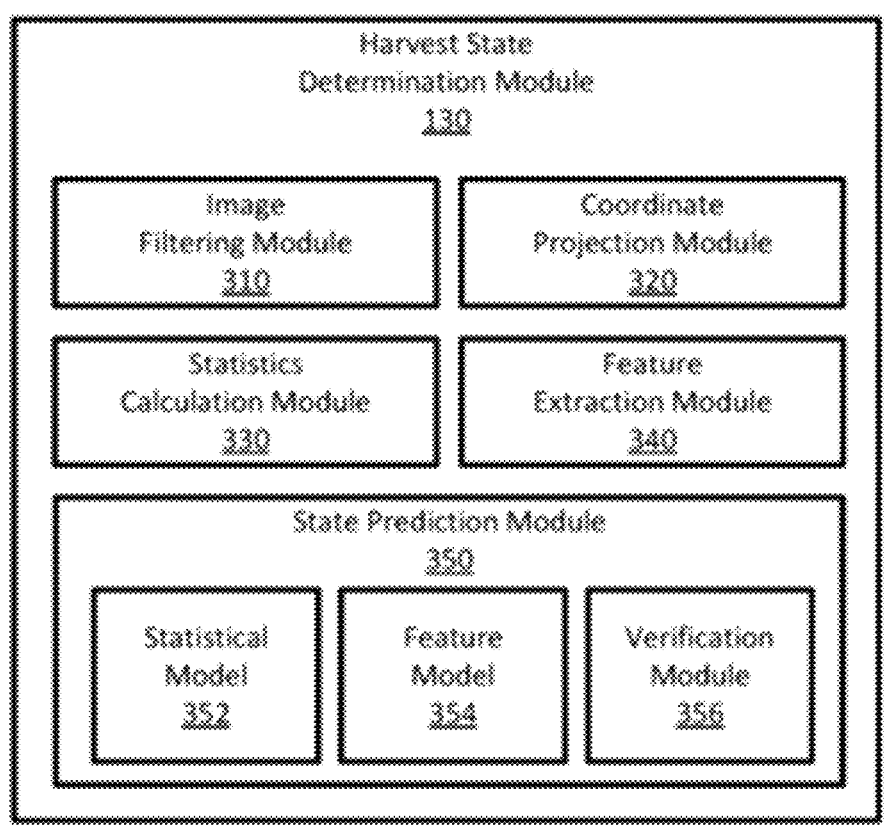
FIG. 3 illustrates a block diagram of a harvest state detection module, according to one example embodiment.

FIG. 3 is a block diagram of the harvest state detection module, according to one example embodiment. HSD module 112 determines a harvest state of an agricultural field in an observed image. The HSD module 112 includes a number of modules that act to determine the harvest state: an image filtering module 310, a coordinate projection module 320, a statistics calculation module 330, a feature extraction module 340, and a state prediction module 350.

The image filtering module 310 inputs an observed image and outputs a filtered image. The observed image may be accessed from the image store 122 or received from observation system 150. A filtered image is the observed image that has been filtered such that it can be processed by HSD module 130 to determine the harvest state of the agricultural field in the observed image.

For example, an observed image received from an observation system 140 may be, originally, unsuitable for determining a harvest state. The observed image measures the radiance of light reflected off of the Earth's surface as pixel values. The measured radiance values from light that may have undergone scattering. The scattering effects reflected in the pixel values of an observed image cause problems when determining the harvest state. The scattering effects render observed images inconsistent, inaccurate, and, generally, untenable in accurately determining the harvest state of raw observed images. Thus, in some embodiments, image filtering module 310 corrects the scattering effects in the observed images such that the harvest state prediction module 350 can determine the harvest state in the filtered image.

To illustrate, consider, for example, an observed image that is an image of an agricultural field taken by a satellite orbiting the Earth. The light measured in the observed image takes the following path: (i) light enters the atmosphere and travels towards an agricultural field on the surface of the Earth, (ii) light is diffusely reflected from the agricultural field and/or objects in the agricultural field, (iii) some of the reflected light travels away from the Earth's surface towards the satellite, and (iv) the reflected light is measured by an image sensor on the satellite as radiance values in an observed image. Here, molecules in the atmosphere induce wavelength-dependent scattering on the light as it travels towards and/or away from the Earth's surface. Thus, the observed image may be generated from light scattered from its original path. In response, image filtering module 310 filters, in an example, the observed image using Top of Atmosphere (TOA) reflectance values to correct for atmospheric scattering effects in the observed image. Other examples of filtering for various atmospheric effects are also possible. For example, clouds in the atmosphere may reflect light in detrimental ways or occlude the agricultural field in an observed image. As such, image filtering module 310 may filter the observed image using a cloud masking technique to correct for clouds in an observed image.

The image filtering module 310 may also remove pixels from an observed image (e.g., using cropping, selective deletion, etc.). For example, an observed image may include obstacles or structures (e.g., farm houses, roads, farm equipment) that may be detrimental in determining the harvest state of an agricultural field. Image filtering module 310 removes the detrimental pixels by, for example, cropping out pixels from the observed image. The resulting image is an image that provides more accurate data for determining a harvest state.

The coordinate projection module 320 receives an observed (or filtered) image as input and assigns the image coordinates in a universal coordinate system. Generally, received observed images include a projection that portrays a portion of the Earth's three-dimensional surface as a two-dimensional observed image. The coordinate projection module 320 assigns coordinates to the observed image that define how the two-dimensional projection of the three-dimensional surface is related to real places on the Earth. For example, the coordinate projection module 320 may assign latitude and longitude coordinates to pixels in the observed image.

In some cases, observed images may already include coordinates in a coordinate system that is not the universal coordinate system. For example, different observation systems may project Earth's three-dimensional surfaces as a two-dimensional observed image using different projection techniques and coordinate reference systems. In another example, some observed images have a coordinate system that is accurate for only certain areas on the Earth's surface (e.g., Universal Transverse Mercator zones). In these cases, coordinate projection module 320 converts the coordinates of the observed image (or filtered image) to the universal coordinate system. As an example, the projection system may assign coordinates to observed images in the EPSG 4326-WGS 84 coordinate system. Normalizing coordinate systems to a universal coordinate system is beneficial when tracking images between agricultural fields or comparing multiple agricultural fields.

Hereafter, observed images that have been filtered by the image filtering module 310 and assigned coordinates in the universal coordinate system by the coordinate projection module 320 will be referred to as input images.

The statistics calculation module 330 calculates an image statistics set for an input image. The image statistics are used to train models that predict a harvest state of an agricultural field. In some embodiments, the statistics calculation module 330 calculates the mean, median, mean/median, and standard deviation for the channels and indices included below.

The statistics calculation module 330 may calculate a color space and/or convert between two different color spaces. The color spaces may include red-green-blue (RGB), hue-saturation-value (HSV), CIELAB, CIE 1931 XYZ, principal component analysis (PCA), color spaces including a near-infrared band (NIR), etc. Generally, an input image is in the RGB color space because the observation system is configured as an image sensor. RGB images have red (R), green (G), and blue (B) color bands. HSV is an alternative representation of the RGB space and includes a representation of the brightness in the image (e.g., "value"). The brightness can be useful in identifying features in an observed image. NIR bands may be provided as an additional channel in some observed images. Other color spaces are also possible.

The statistics calculation module 330 may calculate or approximate various vegetation indices for the image statistics set. The vegetation indices are calculated using the reflectance values derived from pixel values of pixels in the input image. Reflectance values are decimal values between 0 and 1.

The statistics calculation module 330 may calculate the Normalized Difference Vegetation Index (NDVI). The NDVI is calculated as follows:

$$NDVI = \frac{NIR - Red}{NIR + Red} \qquad (1)$$

where NIR is the image reflectance in the near infrared band, and Red is the image reflectance in the red band. The NDVI is a decimal value between −1 and 1. An NDVI value in the range of 0.2 and 0.8 is an indication of healthy vegetation.

The statistics calculation module 330 may calculate the Enhanced Vegetation Index (EVI). The EVI is calculated as follows:

$$EVI = 2.5 * \left( \frac{NIR - Red}{NIR + (6*Red - 7.5*Blue + 1)} \right) \qquad (2)$$

where NIR is the image reflectance in the NIR band, Blue is the image reflectance in the blue band, and Red is the image reflectance in the red band. The EVI is a decimal value between −1 and 1. An EVI value in the range of 0.2 to 0.8 is an indication of healthy vegetation.

The statistics calculation module 330 may calculate the Simple Ratio index (SR). The SR is calculated as follows:

$$SR = \left( \frac{NIR}{Red} \right) \qquad (3)$$

where NIR is the image reflectance in the near-infrared band, and Red is the image reflectance in the red band. SR is a decimal value between 0 and 30. SR values in a range of 2 to 8 are an indication of healthy vegetation.

The statistics calculation module 330 may calculate the Red-Green Ratio (RGR). The RGR is calculated as follows:

$$RGR = \frac{mean(Red)}{mean(Green)} \qquad (4)$$

where Red is the reflectance in the red band, and Green is the reflectance in the Green band. The RGR is a decimal value between 0.1 and 8. An RGR in the range of 0.7 to 3 is an indication of healthy vegetation.

The statistics calculation module 330 may calculate the Photochemical Reflectance Index (PRI). The PRI is calculated as follows:

$$PRI = \frac{Blue - Green}{Blue + Green} \qquad (5)$$

where Red is the reflectance in the red band, and Green is the reflectance in the green band, and Blue is the reflectance in the blue band. The PM is a decimal value between −1 and 1. A PRI in the range of −0.2 to 0.2 is an indication of healthy vegetation.

The statistics calculation module 330 may calculate the Structure Insensitive Pigment Index (SIPI). The SIPI is approximated as follows:

$$SIPI \cong \frac{NIR - \text{Blue}}{NIR - \text{Red}} \quad (6)$$

where Red is the reflectance in the red band, and Blue is the reflectance in the blue band, and NIR is the reflectance in the near-infrared band, where SIPI is a decimal value between 0 and 2, and an indication of healthy vegetation is in the range of 0.8 to 1.8.

The statistics calculation module 330 may calculate the Atmospherically Resistant Vegetation Index (ARVI). The ARVI index is calculated as follows:

$$ARVI = \frac{NIR - (2 * \text{Red} - \text{Blue})}{NIR + (2 * \text{Red} - \text{Blue})} \quad (7)$$

where Red is the reflectance in the red band, and Blue is the reflectance in the blue band, and NIR is the reflectance in the near-infrared band. The ARVI is a decimal value between −1 and 1. An ARVI in the range of 0.2 to 0.8 is an indication of healthy vegetation.

Figure 4:
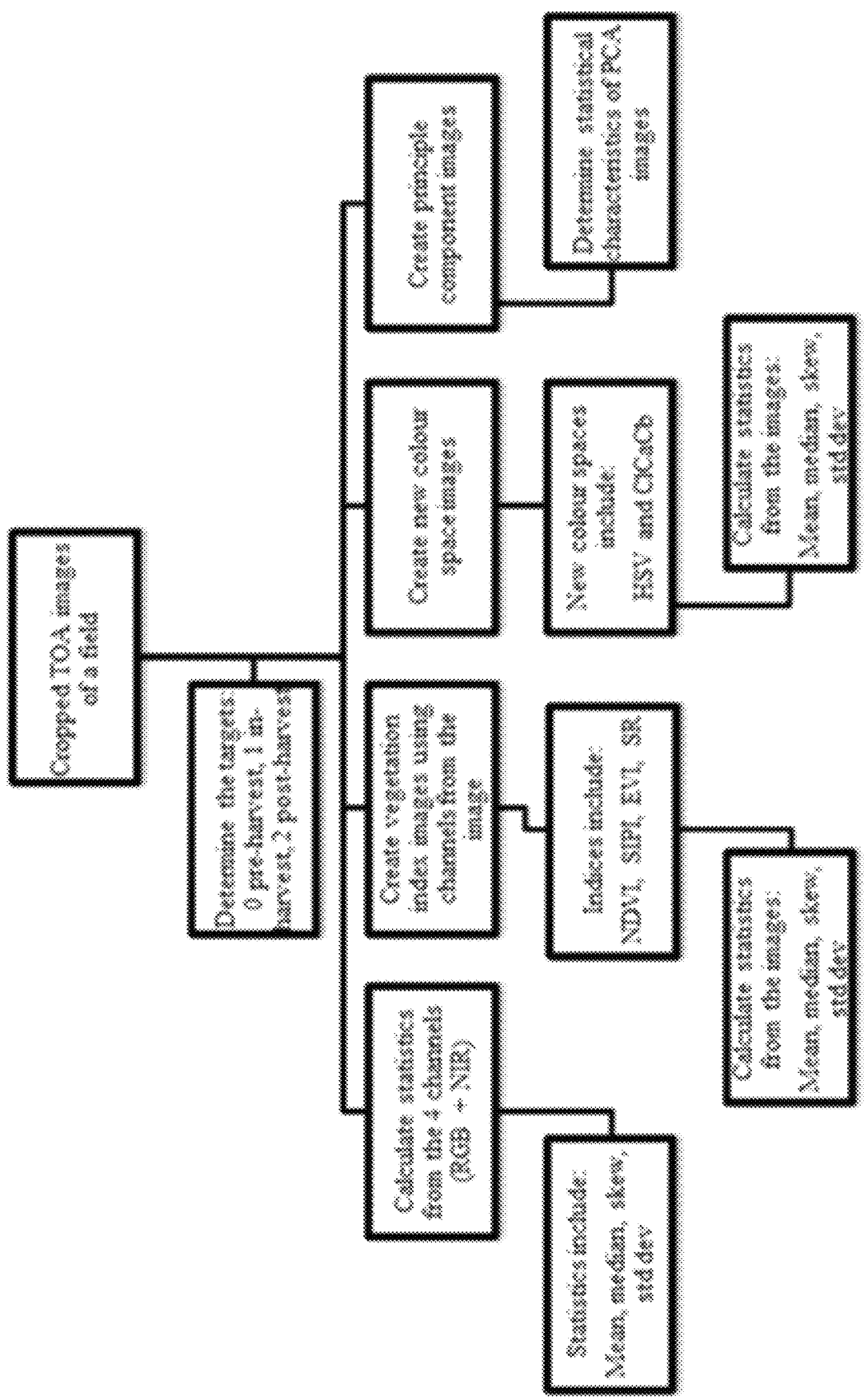
FIG. 4 illustrates a block diagram of example image statistics that may be calculated and included in the image statistics set, according to one example embodiment.

The statistics calculation module 330 may also calculate the mean, median, and standard deviation for the channels and vegetation indices indicated above. FIG. 4 illustrates a block diagram of additional example image statistics that the statistics calculation module may calculate and include in the image statistics set, according to one example embodiment. Each image statistic may be used to predict a harvest state of the agricultural field in the input image.

Returning to FIG. 3, the feature extraction module 340 determines a feature set from an input image. A feature is any variable derived from an input image that may indicate the harvest state for an agricultural field in the image. For example, a feature may be a group of pixels in an input image representing a plant. Another example feature may be an abrupt change in color of the input image. In some cases, feature extraction module 340 may determine that latent information in the pixel values of an input image represent a feature. In other examples, the features may be a statistical analysis of an observed image. For example, the feature extraction module 340 performs a principal component analysis on an observed image to determine the feature set. Feature extraction module 340 may employ various systems to perform feature extraction. For example, feature extraction module 340 may employ Convolutional Neural Networks (CNN), Deep Learning (DL), Multi-Layered Prediction (MLP), and principal component analysis (PCA), etc. to determine features from an input image.

Predicting a Harvest State

The state prediction module 250 of HSD module 130 determines the harvest state of an agricultural field in an input image using predictions from one or more statistical models (e.g., statistical model 252) and one or more feature models (e.g., feature model 254). The state prediction module 250 may determine, in an example, that the harvest state is "pre-harvest," "in-harvest," or "post-harvest." In some examples, the state prediction module 250 may also determine a likelihood for the determined harvest state.

The state prediction module 250 employs a statistical model to predict a harvest state using image statistics in an image statistics set. The image statistics may be determined by the statistics calculation module 330 as described above. Each of the one or more statistical models may be trained in a different manner and use different image statistics to predict a harvest state of an input image. For example, one statistical model may predict that the harvest state is "in-harvest" based on the NDVI, while another statistical model may predict that the harvest state is "pre-harvest" based on the SR.

The state prediction module 250 employs a feature model to predict a harvest state using features in a feature set. The features may be determined by the feature extraction module 340 as described above. Each of the feature models can be trained in a different manner and use different features to predict a harvest state of an input image. For example, one feature model may predict that the harvest state is "post-harvest" based on identified plants in the image, while another statistical model may predict that the harvest state is "in-harvest" based on identified color changes in the image.

In an embodiment, one or more of the statistical models are ensembled ("statistical ensemble"). In this case, the state prediction module 250 employs the statistical ensemble to determine an aggregate statistical prediction of the harvest state using predictions from one or more statistical models. To illustrate, the state prediction module 250 employs each of the one or more statistical models in a statistical ensemble to generate a statistical sub-prediction of the harvest state. Statistical sub-predictions for the harvest state may be derived from one or more of the image statistics in an image statistics set. The state prediction module 250 determines an aggregate statistical prediction for the harvest state based on the determined statistical sub-predictions. In an example, the aggregate statistical prediction for the harvest state is the harvest state predicted by a plurality of the statistical models. Other examples of cross-validating and ensembling the predictions to determine the aggregated statistical prediction are also possible as described below.

Figure 5:
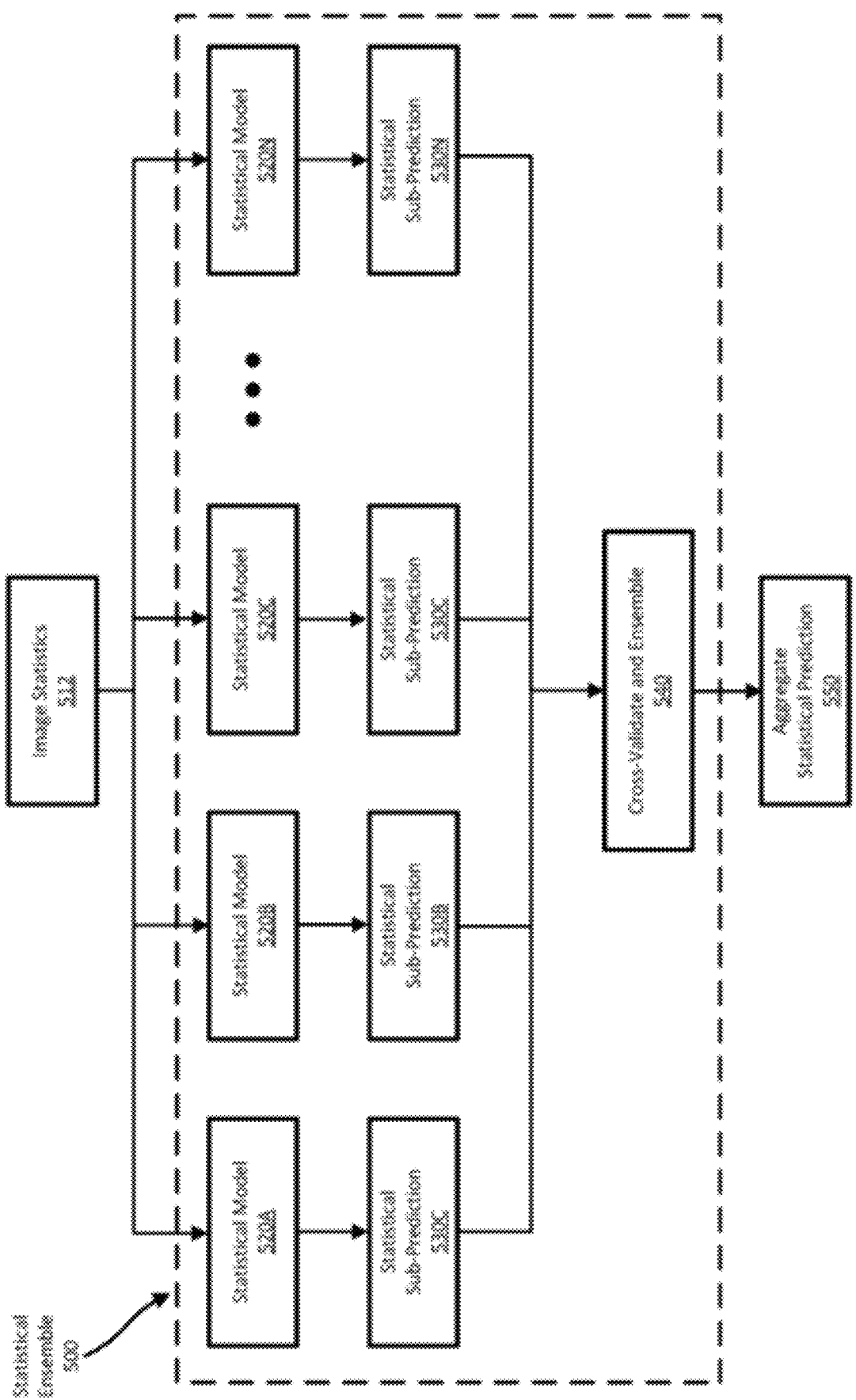
FIG. 5 illustrates a statistical ensemble, according to one example embodiment.

FIG. 5 illustrates a statistical ensemble generating an aggregate statistical prediction, according to one example embodiment. The statistical ensemble 500 includes a number N of statistical models (e.g., 520A, 520B, 520C, . . . , 520N). An image statistics set 512 is input to each of the statistical models. The statistical models each output a statistical sub-prediction (e.g., 530A, 530B, 530C, . . . , 530N) of the harvest state based on the image statistics. Each statistical model may employ different techniques that utilize different image statistics to generate their respective sub-predictions. For example, one statistical model (e.g., 520A) may be an ExtraTreesClassifier, another statistical model (e.g., 520B) may be an XGBoost, while another statistical model (e.g., 520C) may be a Support Vector Classifier. In various embodiments, other statistical models may be used. The state prediction module 350 cross validates and ensembles 540 the sub-predictions to determine an aggregate statistical prediction 550 for the harvest state.

In an embodiment, one or more of the feature models are ensembled ("feature ensemble"). In this case, the state prediction module 250 employs the feature ensemble to determine an aggregate feature prediction of the harvest state using predictions from one or more feature models. To illustrate, the state prediction module 250 employs each of the one or more feature models in a feature ensemble to generate a feature sub-prediction of the harvest state. Feature sub-predictions for the harvest state may be derived from one or more of the features in a feature set. The state prediction module 250 determines an aggregate feature prediction for the harvest state based on the determined feature sub-predictions. In an example, the aggregate feature prediction for the harvest state is the harvest state predicted by a plurality of the feature models. Other examples of cross-validating and ensembling the predictions to determine the aggregated feature prediction are also possible as described below.

Figure 6:
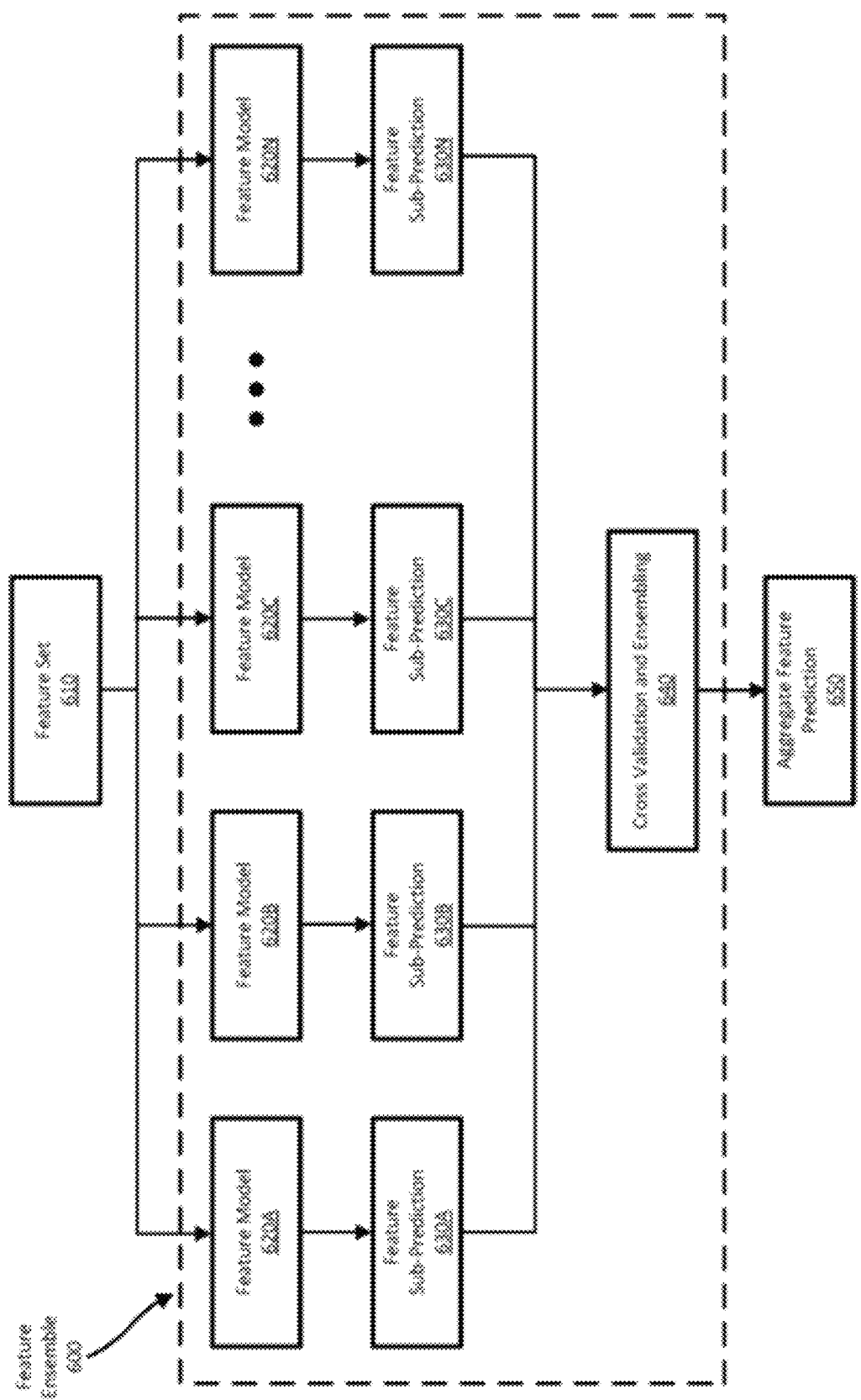
FIG. 6 illustrate a feature ensemble, according to one example embodiment.

FIG. 6 illustrates a feature ensemble generating an aggregate feature prediction, according to one example embodiment. The feature ensemble 600 includes a number N of feature models (e.g., 620A, 620B, 620C, . . . , 620N). An image statistics set 612 is input to each of the feature models. The feature models each output a feature sub-prediction (e.g., 630A, 630B, 630C, . . . , 630N) of the harvest state based on the features. Each feature model may employ different techniques that utilize different features to generate their respective sub-predictions. For example, one feature model (e.g., 620A) may be a convolutional neural network, another feature model (e.g., 620B) may be a deep learning algorithm, while another feature model (e.g., 620C) may be a multi-layer perceptron. In various embodiments, other feature models may be used. The state prediction module 360 cross validates and ensembles 640 the sub-predictions to determine an aggregate feature prediction 650 for the harvest state.

The state prediction model 350 determines a harvest state based on the aggregate feature prediction and the aggregate statistical prediction. In an example, the determined harvest state is the most likely harvest state as indicated by the aggregate statistical prediction and the aggregate feature prediction.

In some embodiments, state prediction module 350 performs recursive indicator extraction with cross validation to determine which sub-predictions most significantly indicate a harvest state. For example, the prediction module 350 may employ ten different models that determine sub-predictions based on ten different image statistics and/or features. The prediction module 350 may select the five most indicative sub-predictions for determining a harvest state.

In various embodiments, state prediction module 250 may determine a harvest state using other configurations of ensembled models.

Model Training and Validation

The HSD module 130 trains the models of a state prediction module 350 using a number of input images and/or observed images ("training images") having a previously determined harvest state. To illustrate, the pixels of a training image are shown to a human and the human identifies the agricultural field in the image as "pre-harvest," "in-harvest," or "post-harvest." The statistics calculation module 330 determines an image statistics set for the training image and the feature extraction module 340 determines a feature set for the training image. The image statistics set and the feature set are associated with the harvest state of the image and can be used to train one or more statistical models and one or more feature models, respectively. In another example, a training image is an observed image or input image having a harvest state determined by a previously trained model ("previous model"). To illustrate, the training image is input into a previous model trained to determine a harvest state. The previous model outputs a harvest state for the training image and the image statistics set and feature set for the training image are associated with the harvest state. Accordingly, the image statistics set and feature set may be used to train one or more statistical models and one or more feature models, respectively.

HSD module 130 trains one or more statistical models (e.g. statistical model 352) using the training images and their image statistics ("training information"). Each training image and its training information are associated with its determined harvest state. HSD module 130 inputs a number of training images, training information, and determined harvest states into one or more statistical models to train the models to determine harvest states. During training, the statistical models determines latent information included in the training information that is associated with specific harvest states. Additionally, HSD module 130 trains one or more feature modules (e.g., feature model 354) in a similar manner.

HSD module 130 includes a verification module 356 that validates the one or more statistical models, one or more feature models, and/or ensembled models trained for the state prediction module 350 ("trained models"). The validation determines if the trained models are accurately determining the harvest state of an input image.

Verification module 356 validates trained models by comparing a previously determined harvest state ("true harvest state") for a training image to a harvest state for the training image determined by the state prediction model 350 ("predicted harvest state"). In other words, validation relates the predicted harvest states of newly trained models to the true harvest states that were externally validated and collected.

The verification module 356 may determine the F-1 Score, precision, recall, and accuracy when validating the training models. The methods used to determine overall accuracy are discussed below.

In the calculations below, the abstract confusion matrix shown in Table I is used for notation.

TABLE I

|  |  | Predicted class | | |
|---|---|---|---|---|
|  |  | A | B | C |
| Known class (class label in data) | A | $tp_A$ | $e_{AB}$ | $e_{AC}$ |
|  | B | $e_{BA}$ | $tp_B$ | $e_{BC}$ |
|  | C | $e_{CA}$ | $e_{CB}$ | $tp_C$ |

The verification module 356 may determine an accuracy of the training models. Accuracy is the overall correctness of a training model and is calculated as the sum of correct predicted harvest states divided by the total predicted harvest states.

The verification module 356 may determine the precision of the training models. Precision is a measure of the accuracy provided that a harvest state has been predicted. It is defined by the following:

$$PrecisionA = \frac{tpA}{tpA + eBA + eCA} \quad (8)$$

where tpA is number of correct predictions for A, eBA is the number where A is predicted and B is measured, and eCA is the number where A is predicted and C is measured.

The verification module 356 may determine a recall of the training models. Recall is a measure of the ability of a training model to select harvest states of a certain type from a data set.

$$RecallA = SensitivityA = \frac{tpA}{tpA + eAB + eAC} \quad (9)$$

where tpA is the number of correct predictions for A, eAB is the number where B is predicted and A is measured, and eAC is the number where C is predicted and A is measured.

The verification module 356 may determine an F1 score of the training models. The F1 score is the harmonic average of the precision and recall, where an F1 score reaches its best value at 1 (perfect precision and recall) and worst at 0.

$$F_1 = \frac{2}{\frac{1}{\text{recall}} + \frac{1}{\text{precision}}} = 2 \cdot \frac{\text{precision} \cdot \text{recall}}{\text{precision} + \text{recall}} \quad (10)$$

Determining a Harvest State

Figure 7:
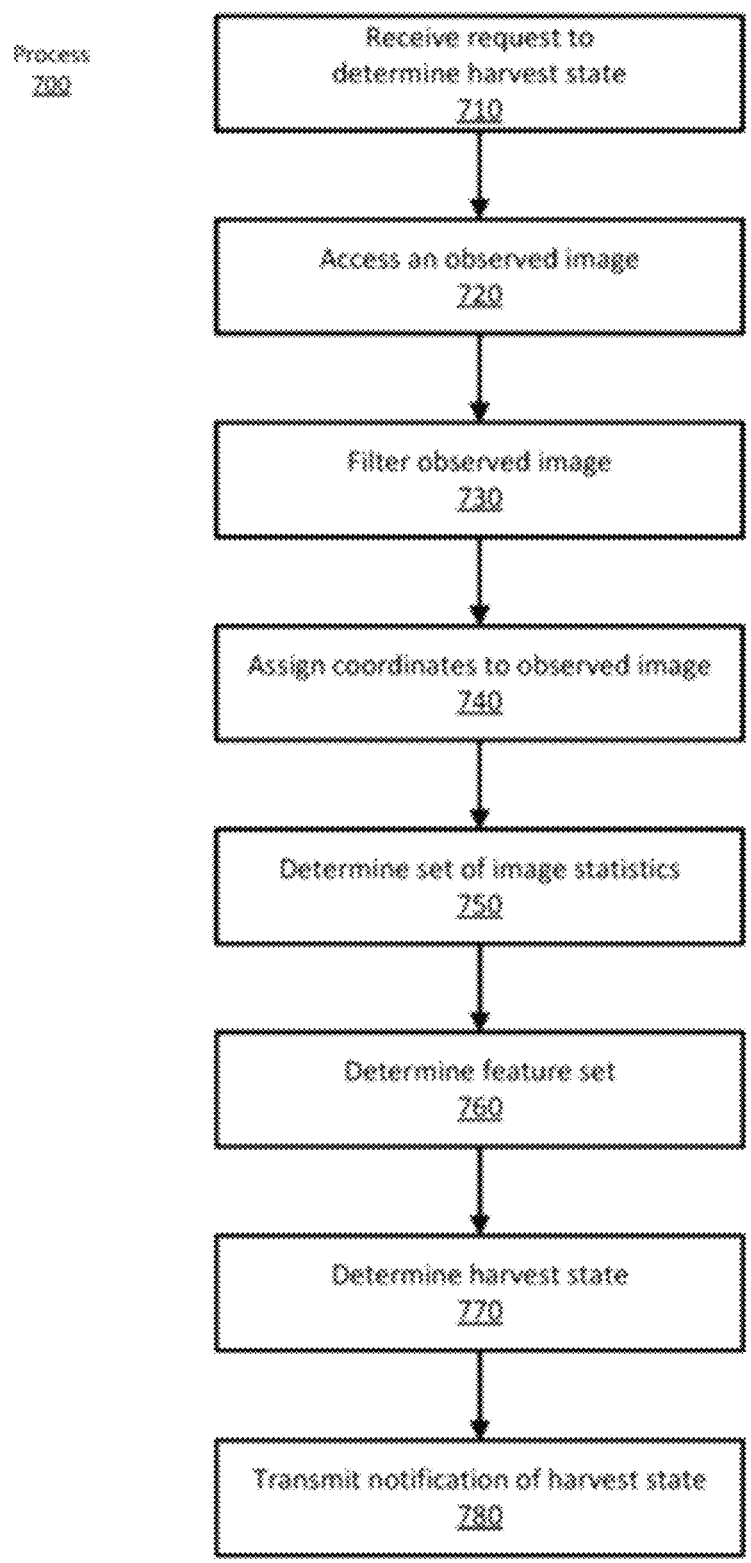
FIG. 7 illustrates a process for determining a harvest state, according to one example embodiment.

FIG. 7 illustrates a process for determining a harvest state, according to one example embodiment. In an example embodiment, the network system 120 executes the process 700 to determine a harvest state.

The client system 110 generates a request to determine a harvest state for an agricultural field and transmits the request to the network system 120 via the network 150. The network system 120 receives 710 the request to determine the harvest state via the network 150. The network system 120 accesses 720 an observed image of the agricultural field from the image store 122. The observed image stored in the image store 122 is received from observation system 140 via the network 150.

An HSD module 130 on network system 120 determines the harvest state of the image. To do so, an image filtering 310 module of HSD module 130 filters 730 the observed image. A coordinate projection module 320 of HSD module 130 assigns 740 universal coordinates to the observed image. The filtered and coordinate assigned image are used as an input image.

A statistics calculation module 330 of HSD module 130 determines 750 an image statistics set for the input image. Additionally, a feature extraction module 340 of the HSD module 130 determines 760 a feature set for the input image.

A state prediction module 350 of the HSD module 130 determines 770 a harvest state for the input image using the determined feature set and image statistics set. In an example embodiment, the state prediction module 350 employs an ensemble of one or more statistical models (e.g., statistical model 352) to determine an aggregate statistical prediction. Additionally, the state prediction model employs an ensemble of one or more feature models (e.g., feature model 354) to determine an aggregate feature prediction. The state prediction module 350 determines the harvest state based on the aggregate feature prediction and the aggregate statistical prediction.

The network system 120 transmits 780 a notification including the determined harvest state to the client system 110 via the network 150. In some examples, the network system 120 may automatically transmit a determined harvest state to the client system 110 if a determined harvest state is a particular harvest state. In some cases, the notification may be transmitted independently from receiving a request for the notification. The notification may be an electronic email message, a text message, an app notification, a push notification, or other type of notification or message.

Example Computer System

Figure 8:
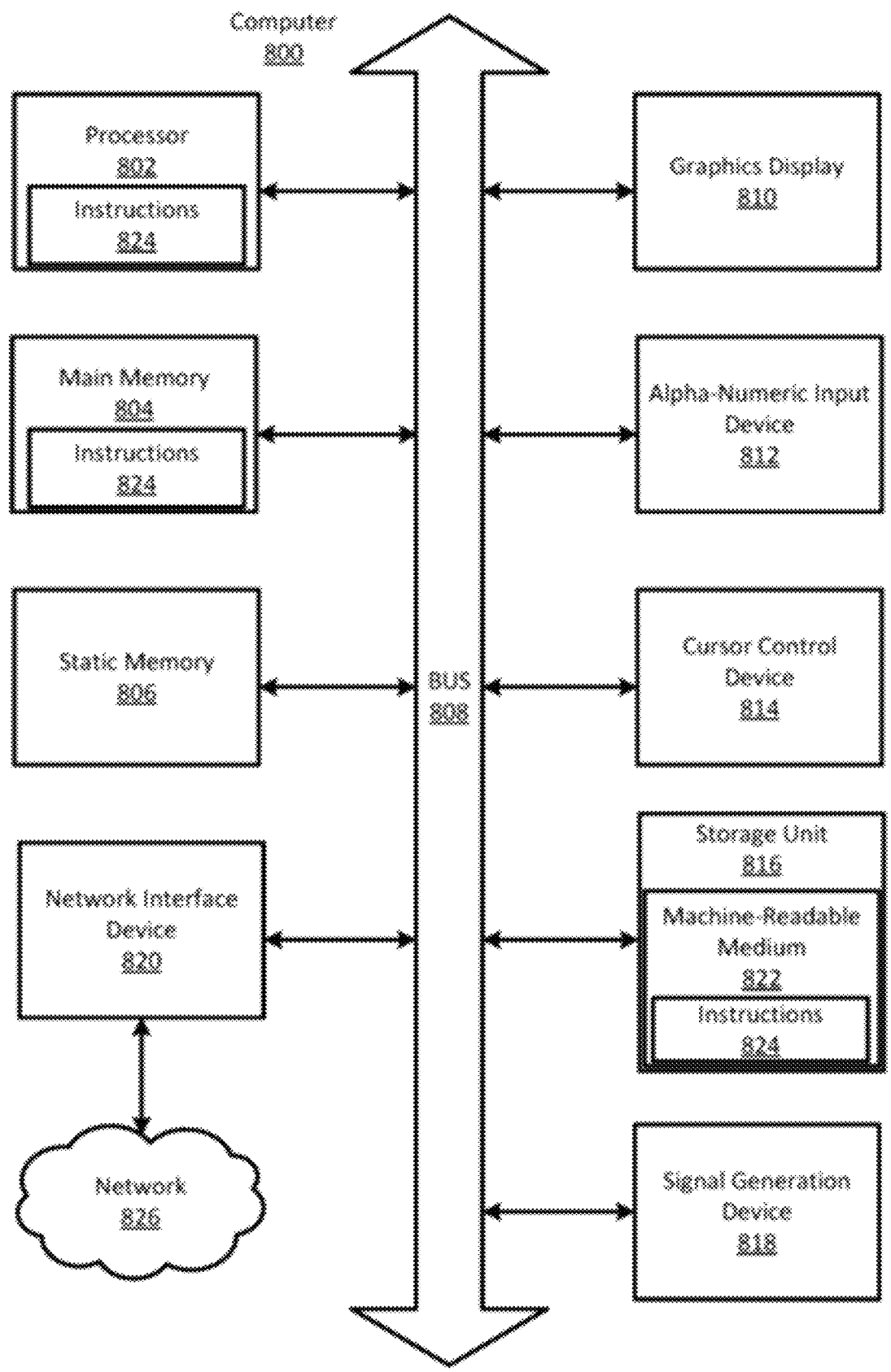
FIG. 8 is a block diagram illustrating components of an example machine for reading and executing instructions from a machine-readable medium, according to one example embodiment.

FIG. 8 is a block diagram illustrating components of an example machine for reading and executing instructions from a machine-readable medium. Specifically, FIG. 8 shows a diagrammatic representation of network system 120 and client device 110 in the example form of a computer system 800. Thus, the computer system implements method 700 of FIG. 7 using the HSD module of FIG. 3. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the client device 110 or network system 120 described in FIG. 1. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 120) via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A method for determining harvest state of an agricultural field based on imagery of the agricultural field, the method comprising:
obtaining an observed image of the agricultural field from a data store containing agricultural image data;
filtering the observed image using an image filtering module to provide a filtered image for processing;
assigning coordinates to the filtered image, the assigning coordinates to the filtered image performed by a coordinate projection module to provide an input image;
processing the input image to determine a set of image statistics for the input image using a statistics calculation module wherein the set of image statistics include at least one vegetation index for the agricultural field;
determining by a harvest state prediction module the harvest state of the agricultural field using the set of image statistics, wherein the harvest state is selected from a set comprising a pre-harvest state indicative of the agricultural field that has been planted but not harvested, an in-harvest state indicative of the agricultural field being partially harvested, and a post-harvest state indicative of the agricultural field being fully harvested; and
electronically transmitting a notification of the harvest state of the agricultural field to a computing device.

2. The method of claim 1 further comprising remote sensing the agricultural image data and storing the agricultural image data in the data store.

3. The method of claim 1 further comprising processing the input image using a feature extraction module to determine a feature set for the input image, in which the feature set is indicative of a prescribed feature being present in the agricultural field, and wherein the feature set is used by the harvest state prediction module in determining the harvest state of the agricultural field.

4. The method of claim 3 wherein the feature extraction module uses a plurality of feature models to generate a plurality of feature sub-predictions of the harvest state, in which the feature sub-prediction generated by each feature model is indicative of a different prescribed feature being present in the agricultural field, the method further comprising aggregating the feature sub-predictions to result in an aggregate feature prediction and wherein the aggregate feature prediction is used by the harvest state prediction module in determining the harvest state.

5. The method of claim 4 wherein each of the plurality of feature models has been verified using a verification module in which the verification module receives a training image and a known harvest state of the training image as inputs in order to determine accuracy of each feature model.

6. The method of claim 1 further comprising applying a plurality of statistical models to the set of image statistics to generate a plurality of sub-predictions and aggregating the sub-predictions to result in an aggregate statistical prediction and wherein the aggregate statistical prediction is used by the harvest state prediction module in determining the harvest state.

7. The method of claim 6 wherein each of the plurality of statistical models has been verified using a verification module in which the verification module receives a training image and a known harvest state of the training image as inputs in order to determine accuracy of each statistical model.

8. The method of claim 1 wherein the at least one vegetation index includes at least one of a Normalized Difference Vegetation Index (NDVI) and an Enhanced Vegetation Index (EVI).

9. A computer system comprising:
one or more processors;
a data store containing agricultural image data, the data store in operative communication with the one or more processors;
one or more non-transitory computer-readable storage media storing sequences of program instructions defining a plurality of modules including an image filtering module, a coordinate projection module, a statistics calculation module, and a harvest state prediction module which, when executed by the one or more processors, cause the one or more processors to:
obtain an observed image of the agricultural field from the data store containing agricultural image data;
filter the observed image using the image filtering module to provide a filtered image for processing;
assign coordinates to the filtered image, the assigning coordinates to the filtered image using the coordinate projection module to provide an input image;
process the input image to determine a set of image statistics for the input image using the statistics calculation module wherein the set of image statistics include at least one vegetation index for the agricultural field;
determine by the harvest state prediction module the harvest state of the agricultural field using the set of image statistics, wherein the harvest state is selected from a set comprising a pre-harvest state indicative of the agricultural field that has been planted but not harvested, an in-harvest state indicative of the agricultural field being partially harvested, and a post-harvest state indicative of the agricultural field being fully harvested; and
electronically transmit a notification of the harvest state of the agricultural field to a computing device.

10. The computer system of claim 9 wherein the data store is operatively connected over a network to an observation system for remote sensing the agricultural image data.

11. The computer system of claim 9 wherein the plurality of modules further includes a feature extraction module and which when executed further cause the one or more processors to determine a feature set for the input image, in which the feature set is indicative of a prescribed feature being present in the agricultural field, and wherein the feature set is used by the harvest state prediction module in determining the harvest state of the agricultural field.

12. The computer system of claim 11 wherein the feature extraction module uses a plurality of feature models to generate a plurality of feature sub-predictions of the harvest state, in which the feature sub-prediction generated by each feature model is indicative of a different prescribed feature being present in the agricultural field, the method further comprising aggregating the feature sub-predictions to result in an aggregate feature prediction and wherein the aggregate feature prediction is used by the harvest state prediction module in determining the harvest state.

13. The computer system of claim 12 wherein the plurality of modules further includes a verification module and wherein each of the plurality of feature models has been verified using the verification module in which the verification module receives a training image and a known harvest state of the training image as inputs in order to determine accuracy of each feature model.

14. The computer system of claim 9 wherein the statistics calculation module applies a plurality of statistical models to the set of image statistics to generate a plurality of sub-predictions and aggregates the sub-predictions to result in an aggregate statistical prediction and wherein the aggregate statistical prediction is used by the harvest state prediction module in determining the harvest state.

15. The computer system of claim 14 wherein each of the plurality of statistical models has been verified using a verification module in which the verification module receives a training image and a known harvest state of the training image as inputs in order to determine accuracy of each statistical model.

16. The computer system of claim 9 wherein the at least one vegetation index includes at least one of a Normalized Difference Vegetation Index (NDVI) and an Enhanced Vegetation Index (EVI).

17. A method for determining harvest state of an agricultural field based on imagery of the agricultural field, the method comprising:
   remote sensing agricultural image data and storing the agricultural image data in a data store;
   obtaining an observed image of the agricultural field from the data store containing the agricultural image data;
   filtering the observed image using an image filtering module to provide a filtered image for processing;
   assigning coordinates to the filtered image, the assigning coordinates to the filtered image performed by a coordinate projection module to provide an input image;
   processing the input image to determine a set of image statistics for the input image using a statistics calculation module wherein the set of image statistics include at least one vegetation index for the agricultural field;
   processing the input image using a feature extraction module to determine a feature set for the input image, in which the feature set is indicative of a prescribed feature being present in the agricultural field, and wherein the feature set is used by the harvest state prediction module in determining the harvest state of the agricultural field;
   determining by a harvest state prediction module the harvest state of the agricultural field using the set of image statistics and the feature set, wherein the harvest state is selected from a set comprising a pre-harvest state indicative of the agricultural field that has been planted but not harvested, an in-harvest state indicative of the agricultural field being partially harvested, and a post-harvest state indicative of the agricultural field being fully harvested; and
   electronically transmitting a notification of the harvest state of the agricultural field to a computing device.

18. The method of claim 17 wherein the feature extraction module uses a plurality of feature models to generate a plurality of feature sub-predictions of the harvest state, in which the feature sub-prediction generated by each feature model is indicative of a different prescribed feature being present in the agricultural field, the method further comprising aggregating the feature sub-predictions to result in an aggregate feature prediction and wherein the aggregate feature prediction is used by the harvest state prediction module in determining the harvest state.

19. The method of claim 18 further comprising applying a plurality of statistical models to the set of image statistics to generate a plurality of sub-predictions and aggregating the sub-predictions to result in an aggregate statistical prediction and wherein the aggregate statistical prediction is used by the harvest state prediction module in determining the harvest state.

20. The method of claim 19 wherein each of the plurality of statistical models and each of the plurality of feature models has been verified using a verification module in which the verification module receives a training image and a known harvest state of the training image as inputs in order to determine accuracy of each model.

* * * * *